(12) United States Patent
Moon et al.

(10) Patent No.: US 8,155,461 B2
(45) Date of Patent: Apr. 10, 2012

(54) METHODS AND APPARATUSES FOR ENCODING AND DECODING MULTI-VIEW IMAGE

(75) Inventors: Young-ho Moon, Suwon-si (KR); Woo-sung Shim, Yongin-si (KR); Hak-sup Song, Suwon-si (KR); Jong-bum Choi, Yangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1062 days.

(21) Appl. No.: 12/031,295

(22) Filed: Feb. 14, 2008

(65) Prior Publication Data

US 2008/0240590 A1  Oct. 2, 2008

Related U.S. Application Data

(60) Provisional application No. 60/907,273, filed on Mar. 27, 2007.

(30) Foreign Application Priority Data

Jun. 28, 2007  (KR) .................. 10-2007-0064610

(51) Int. Cl.
*G06K 9/36* (2006.01)
*G06K 9/46* (2006.01)
*H04N 13/02* (2006.01)

(52) U.S. Cl. .......... 382/238; 382/232; 382/236; 348/47; 348/48; 348/409.1; 348/415.1

(58) Field of Classification Search .................. None
See application file for complete search history.

(56) References Cited

U.S. PATENT DOCUMENTS

| 5,612,735 A | * | 3/1997 | Haskell et al. | 348/43 |
|---|---|---|---|---|
| 6,043,838 A | * | 3/2000 | Chen | 348/42 |
| 7,728,878 B2 | * | 6/2010 | Yea et al. | 348/218.1 |
| 2006/0146138 A1 | * | 7/2006 | Xin et al. | 348/207.99 |
| 2006/0222079 A1 | * | 10/2006 | Park et al. | 375/240.16 |
| 2007/0030356 A1 | * | 2/2007 | Yea et al. | 348/207.99 |
| 2008/0089405 A1 | * | 4/2008 | Cho et al. | 375/240.01 |
| 2008/0089412 A1 | * | 4/2008 | Ugur et al. | 375/240.12 |
| 2008/0089596 A1 | * | 4/2008 | Choi et al. | 382/238 |
| 2009/0290643 A1 | * | 11/2009 | Yang | 375/240.16 |
| 2010/0165077 A1 | * | 7/2010 | Yin et al. | 348/42 |

FOREIGN PATENT DOCUMENTS

| JP | 2004-007379 A | 1/2004 |
|---|---|---|
| KR | 10-0590025 B1 | 6/2006 |

* cited by examiner

*Primary Examiner* — Li Liu

(74) *Attorney, Agent, or Firm* — Sughrue Mion, PLLC

(57) ABSTRACT

Methods and apparatuses for encoding and decoding a multi-view image are provided. The method of encoding the multi-view image can use a difference in views between pictures of the multi-view image, add an image area obtained from a picture at one view at a first time to a picture at another view at a second time, thereby generating a reference picture, and perform prediction encoding using the generated reference picture, thereby increasing prediction encoding efficiency.

16 Claims, 10 Drawing Sheets

ORIGINAL IMAGE FRAME (310)

PADDED IMAGE FRAME (320)

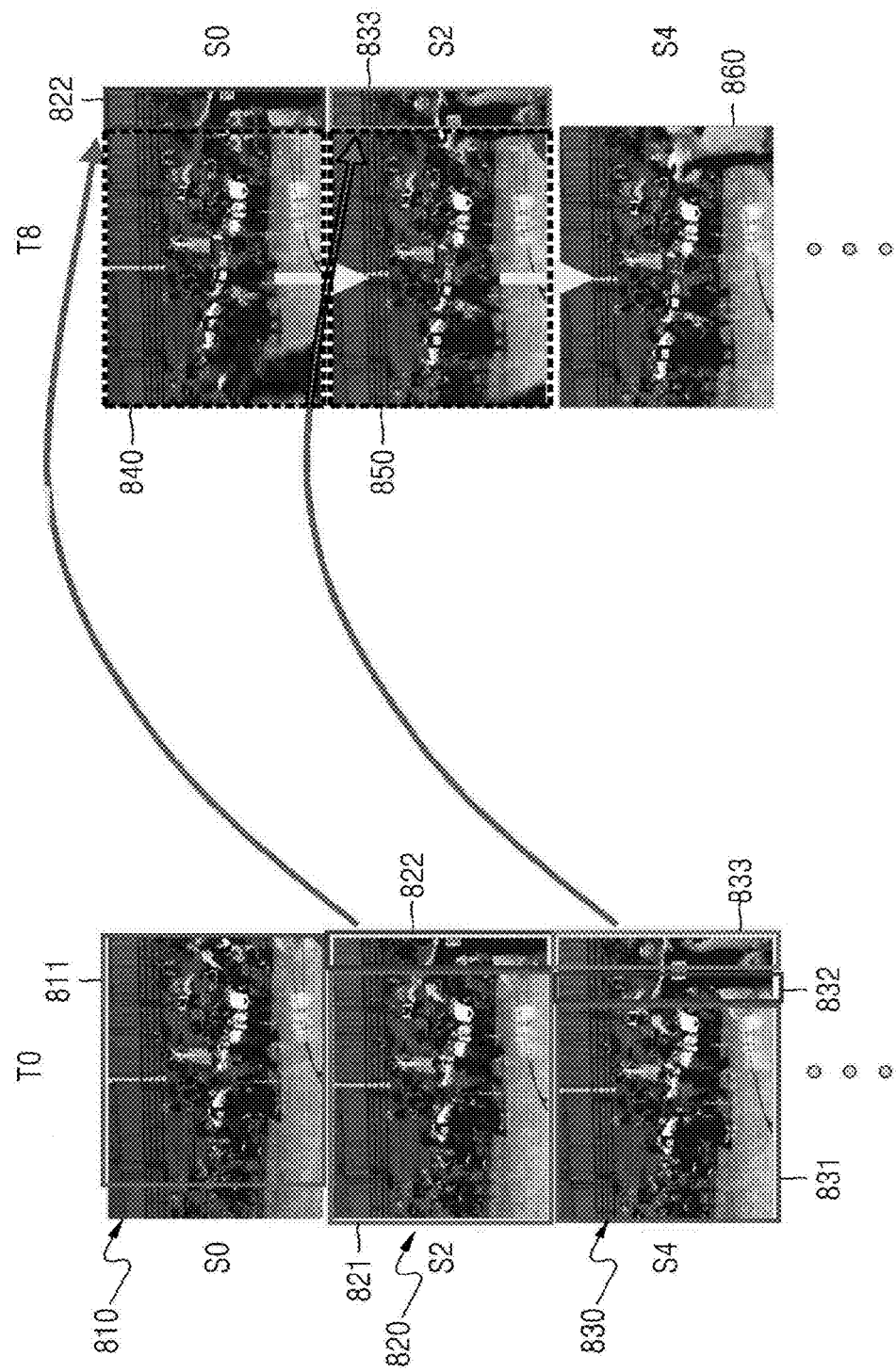

METHODS AND APPARATUSES FOR ENCODING AND DECODING MULTI-VIEW IMAGE

CROSS-REFERENCE TO RELATED PATENT APPLICATION

This application claims the benefit of Korean Patent Application No. 10-2007-0064610, filed on Jun. 28, 2007, in the Korean Intellectual Property Office, and the benefit of U.S. Provisional Patent Application No. 60/907,273, filed on Mar. 27, 2007, in the U.S. Patent and Trademark Office, the disclosures of which are incorporated herein by reference in their entirety.

BACKGROUND OF THE INVENTION

1. Field of the Invention

The present invention relates to methods and apparatuses for encoding and decoding a multi-view image, and more particularly, to methods and apparatuses for encoding and decoding a multi-view image, which add an image region obtained from a picture captured from one viewpoint to a picture captured from another viewpoint by using a difference in viewpoints between the pictures of the multi-view image, thereby generating a reference picture, and which perform prediction encoding by using the generated reference picture, thereby increasing prediction efficiency.

2. Description of the Related Art

In multi-view image encoding, pictures of a multi-view image input from a plurality of cameras are compressively encoded by using temporal correlation, and spatial correlation between the plurality of cameras.

Temporal prediction using the temporal correlation and an inter-view prediction using the spatial correlation predict and compensate for movement of a current picture in units of blocks by using at least one or more reference pictures, thereby encoding an image. That is, in multi-view image encoding, pictures obtained from cameras at different viewpoints, or pictures input at different times from among pictures captured from the same viewpoint can be used as a reference picture. A block having the highest similarity to a current block is searched for in a predetermined search range of the reference picture, and when a similar block is searched for, only differential data between the current block and similar blocks is transmitted, and thus, a data compression ratio is increased.

FIG. 1 is a reference diagram illustrating prediction encoding of a multi-view image.

In FIG. 1, the x-axis indicates the time axis, and the y-axis indicates the view axis. T0 through T8 of the x-axis respectively indicate a sampling time of an image, and S0 through S7 of the y-axis respectively indicate differential views. In FIG. 1, respective horizontal lines indicate a group of image pictures input from the same viewpoint (hereinafter, referred to as view), and respective vertical lines indicate multi-view pictures captured at the same time.

A method of encoding a multi-view image periodically generates an intra picture related to a picture at a base view. Based on the generated intra pictures, the method performs a temporal prediction or an inter-view prediction, thereby predictably encoding other pictures.

Temporal prediction uses the same view, i.e., temporal correlation existing between pictures in a same horizontal line of FIG. 1. For the temporal prediction, a prediction structure using a hierarchical B-picture may be used. Inter-view prediction uses the multi-view image input at the same time i.e., spatial correlation existing between pictures in a same vertical line of FIG. 1.

When the prediction structure of a multi-view image using the hierarchical B-picture performs a prediction by using the same view, i.e., the temporal correlation existing between the pictures in the same horizontal line, the prediction structure predictably encodes a group of image pictures at the same view as a bi-directional picture (hereinafter referred to as "B-picture") by using anchor pictures. Here, the anchor pictures indicate pictures included in the vertical line 110 at a first time T0 and the vertical line 120 at a last time T8 from among the vertical lines illustrated in FIG. 1, wherein the vertical lines 110 and 120 include an intra picture. The anchor pictures in the vertical lines 110 and 120, except for the intra picture (hereinafter referred to as "I picture"), are predictably encoded by using only inter-view prediction. Pictures included in the rest of the vertical lines 130, except for the vertical lines 110 and 120 including the I picture, are non-anchor pictures.

An example in which pictures input at a first view S0 during a predetermined time period are encoded by using the hierarchical B-picture will now be described. From among pictures input at the first view S0, a picture 111 input at the first time T0 and a picture 121 input at the last time T8 are encoded as I pictures. Then, a picture 131 input at a time T4 is bidirectionally and predictably encoded as a B-picture by referring to the I pictures 111 and 121 which are anchor pictures. A picture 132 input at a time T2 is bidirectionally and predictably encoded as a B-picture by using the I picture 111 and the B-picture 131. Similarly, a picture 133 input at a time T1 is bidirectionally and predictably encoded by using the I picture 111 and the B-picture 132, and a picture 134 input at a time T3 is bidirectionally and predictably encoded by using the B-pictures 132 and 131. In this manner, since an image sequence at the same view is hierarchically, bidirectionally, and predictably encoded by using the anchor pictures, such a prediction encoding method is defined as hierarchical B-picture structure. Meanwhile, in Bn (n=1,2,3, and 4) illustrated in FIG. 1, n indicates an $n^{th}$ bidirectionally predicted B-picture. For example, B1 indicates a picture first bidirectionally predicted by using anchor pictures which are either an I picture or a P picture, B2 indicates a picture bidirectionally predicted after the B1 picture, B3 indicates a picture bidirectionally predicted after the B2 picture, and B4 indicates a picture bidirectionally predicted after the B3 picture.

When a multi-view image sequence is encoded, a group of image pictures at the first view S0 that is a base view is encoded by using the aforementioned hierarchical B-picture. In order to encode image sequences at the rest of views, pictures at odd views S2, S4, and S6, and at a last view S7 included in the anchor pictures of the vertical lines 110 and 120, are predictably encoded as P pictures by the inter-view prediction using the I pictures 111 and 121 at the first view S0. Pictures at even views S1, S3, and S5 included in the anchor pictures of the vertical lines 110 and 120 are bidirectionally predicted by using a picture at an adjacent view by the inter-view prediction, and encoded as B-pictures. For example, a B-picture 113 input at a second view S1 at the time T0 is bidirectionally predicted by using the I picture 111 and a P picture 112 respectively at adjacent views S0 and S2.

When all pictures at all views included in the anchor pictures of the vertical lines 110 and 120 are encoded as any one of I, B, and P pictures, the non-anchor pictures in the rest of the vertical lines 130 are bidirectionally and predictably encoded by the temporal and inter-view predictions using the aforementioned hierarchical B-picture.

From among the non-anchor pictures in the rest of the vertical lines 130, pictures at the odd views S2, S4, and S6, and at the last view S7 are bidirectionally and predictably encoded by using anchor pictures at the same view and the temporal prediction using the hierarchical B-picture. From among the non-anchor pictures in the rest of the vertical lines 130, pictures at the even views S1, S3, S5, and S7 are bidirectionally and predictably encoded by not only the temporal prediction using the hierarchical B-picture but also the interview prediction using pictures at adjacent views. For example, a picture 136 input at the second view S1 at the time T4 is predicted by using anchor pictures 113 and 123, and pictures 131 and 135 at adjacent views. P-pictures included in the anchor pictures of the vertical lines 110 and 120 are predictably encoded by using an I picture at a different view input at the same time, or a previous P picture, as described above. For example, a P picture 122 input at a third view S2 at the time T8 is predictably encoded by using the I picture 121 input at a first view S0 at the same time as a reference picture.

In general, a motion prediction is performed within a predetermined region from a position of a reference picture in a same position as a current block that is to be encoded. At this time, in the case where the current block to be encoded is a block located at an edge of the reference picture, the reference picture has to be extended for the motion prediction. According to the related art, motion prediction is performed by extending a reference picture by a method of outwardly extending pixels located in an edge of the reference picture. This method is known as an extrapolation.

FIG. 2 is a diagram illustrating a method of extending a reference picture according to the related art, and FIG. 3 is a reference diagram illustrating an example of a reference picture extended according to the related art.

Referring to FIG. 2, respective pixels located in an edge of an original reference picture 210 are outwardly extended, and thus, the original reference picture 210 is extended. For example, by making all pixels, which are upwardly located from a pixel 211 located in the upper edge and having a pixel value A, have the pixel value A, the original reference picture 210 is upwardly extended. Similarly, by rightward, downwardly, and leftward extending respective pixels 212, 213, and 214, respectively having pixel values B, C, and D, as far as a predetermined range, the original reference picture 210 can be extended. Referring to FIG. 3, a padded image frame 320 generated by extending pixels in an edge of an original image frame 310 can be checked. In this manner, according to the related art, when a reference picture is generated, pixels at an edge of an original reference picture are outwardly extended so as to generate the reference picture.

However, in order to overcome limitations in restricted bandwidth and increase prediction efficiency, a method capable of more efficiently generating a reference picture is necessary, in consideration of characteristics of a multi-view image.

SUMMARY OF THE INVENTION

The present invention provides a method and apparatus for encoding a multi-view image, and a method and apparatus for decoding a multi-view image, which generate a reference picture used in prediction encoding of another picture so that the reference picture is more similar to a picture to be encoded, thereby increasing prediction efficiency of an image and increasing encoding efficiency related to an entire image sequence.

According to an aspect of the present invention, there is provided a method of encoding a multi-view image, the method including the operations of determining a new region of a picture at a second view, wherein the new region is not comprised in a picture at a first view but comprised in the picture at the second view, based on a difference between the picture at the first view and the picture at the second view which are input at a first time, wherein the pictures are from among pictures of a multi-view image input during a first time period via a plurality of image obtainment apparatuses having different views; adding the new region to a picture at the first view input at a second time and generating a reference picture; and encoding a picture at a second view input at the second time based on the generated reference picture.

According to another aspect of the present invention, there is provided a multi-view image encoding apparatus including a plurality of image obtainment apparatuses having different views; a new region determination unit determining a new region of a picture at a second view, wherein the new region is not comprised in a picture at a first view but comprised in the picture at the second view, based on a difference between the picture at the first view and the picture at the second view which are input at a first time, wherein the pictures are from among pictures of a multi-view image input during a first time period via the plurality of image obtainment apparatuses; a reference picture generation unit adding the new region to a picture at the first view input at a second time and generating a reference picture; and an encoding unit encoding a picture at the second view input at the second time based on the generated reference picture.

According to another aspect of the present invention, there is provided a method of decoding a multi-view image, the method including the operations of determining a new region of a picture at a second view, wherein the new region is not comprised in a picture at a first view but comprised in the picture at the second view, based on a difference between the picture at the first view at a first time and the picture at the second view at the first time, which are previously decoded from among encoded pictures of a multi-view image having differential views and included in a bitstream; adding the new region to a decoded picture at the first view at a second time and generating a reference picture; and decoding a picture at the second view at the second time based on the generated reference picture.

According to another aspect of the present invention, there is provided a multi-view image decoding apparatus including a new region determination unit determining a new region of a picture at a second view, wherein the new region is not comprised in a picture at a first view but comprised in the picture at the second view, based on a difference between the picture at the first view at a first time and the picture at the second view at the first time, which are previously decoded from among encoded pictures of a multi-view image having differential views and included in a bitstream; a reference picture generation unit adding the new region to a decoded picture at the first view at a second time and generating a reference picture; and a decoding unit decoding a picture at the second view at the second time based on the generated reference picture.

BRIEF DESCRIPTION OF THE DRAWINGS

The above and other features of the present invention will become more apparent by describing in detail exemplary embodiments thereof with reference to the attached drawings in which:

FIG. 8 is a diagram illustrating an example in which a reference picture is generated by a method of encoding a multi-view image, according to another exemplary embodiment of the present invention;

DETAILED DESCRIPTION OF THE INVENTION

The present invention will now be described more fully with reference to the accompanying drawings, in which exemplary embodiments of the invention are shown.

A method of encoding a multi-view image according to an exemplary embodiment of the present invention adds a region that is not included in a picture at one view, from among multi-view pictures input during a predetermined time period via a plurality of image obtainment apparatuses having differential views, to a picture at another view, thereby generating a reference picture, and performs prediction encoding by using the generated reference picture, so that prediction efficiency of an image is increased.

Figure 4A:
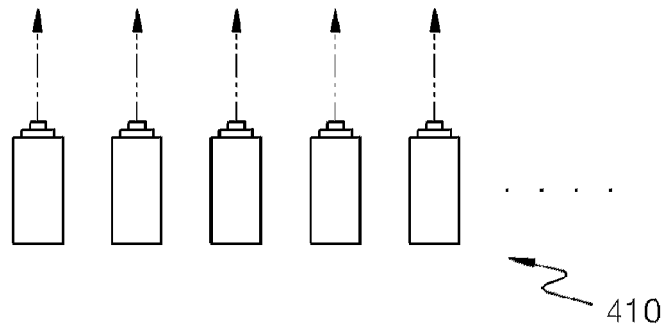
FIGS. 4A through 4C are diagrams illustrating configuration examples of a plurality of image obtainment apparatuses according to an exemplary embodiment of the present invention.
Figure 4B:
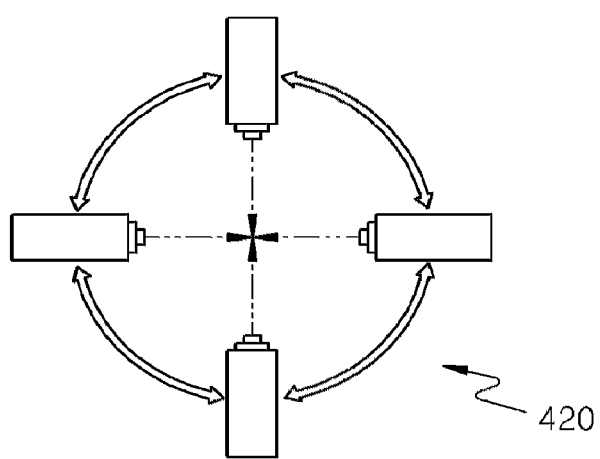
Figure 4C:
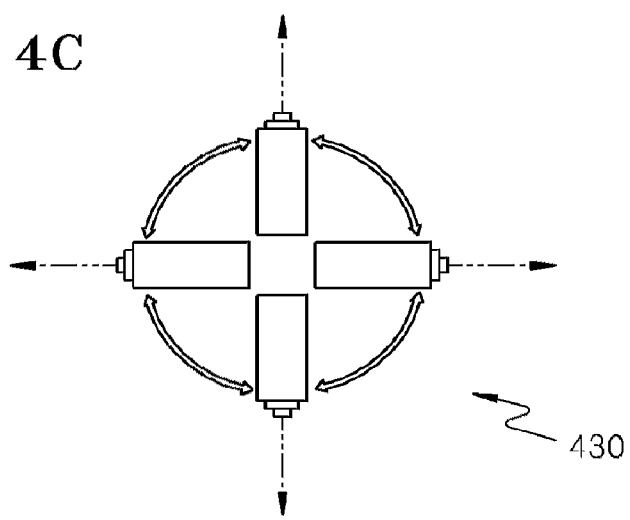

FIGS. 4A through 4C are diagrams illustrating configuration examples of a plurality of image obtainment apparatuses according to an embodiment of the present invention. FIGS. 4A through 4C respectively illustrate cases in which a plurality of cameras are disposed in a parallel configuration 410, a convergent configuration 420, and a divergent configuration 430. The disposition of the cameras and the number of cameras may be changed.

Figure 5:
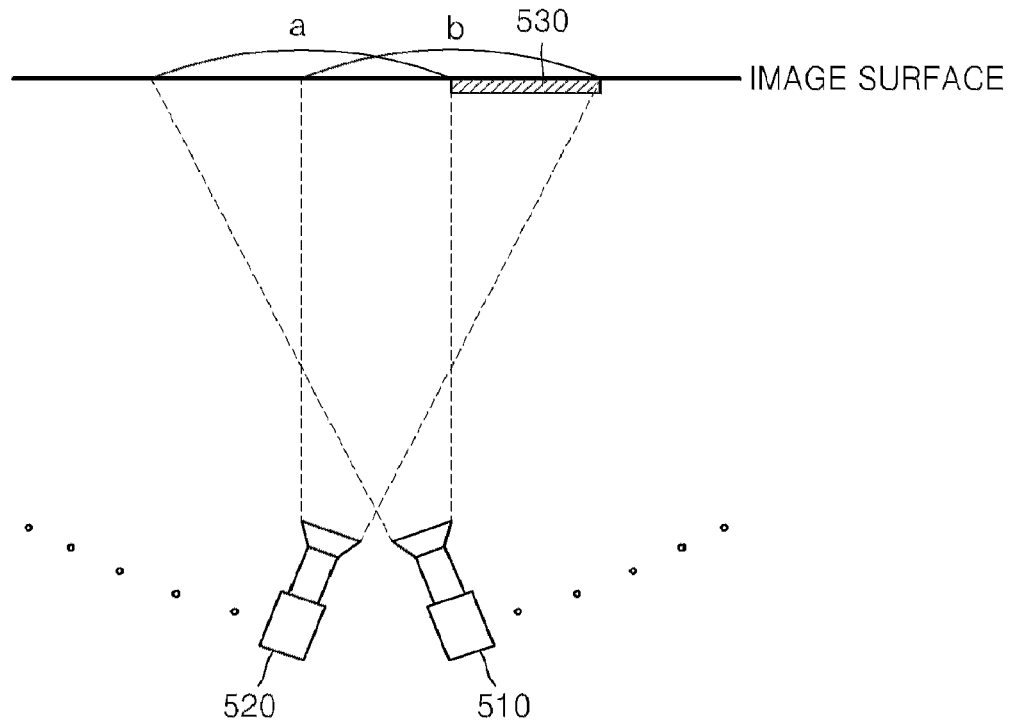
FIG. 5 is a diagram illustrating a difference between images obtained from respective cameras according to arranged positions of the cameras.

FIG. 5 is a diagram illustrating a difference between images obtained from respective cameras according to arranged positions of the cameras.

In a multi-view image, a region that is not viewed by one camera may be viewed by another camera according to arranged positions of the cameras. Referring to FIG. 5, assuming that an image obtained by a first camera 510 having a first view is indicated as 'a', and an image obtained by a second camera 520 having a second view is indicated as 'b', the second camera 520 may obtain a new region 530 that is not obtained by the first camera 510. Generally, a region disappearing or appearing due to movement of an object in a screen occurs in an image sequence, and such a region is defined as an occlusion region. Due to characteristics of a multi-view image, the occlusion region incapable of being obtained in a picture at one view may be obtained in a picture at another view. An exemplary embodiment of the present invention generates a reference picture more similar to a picture to be encoded, by considering such characteristics, thereby increasing prediction encoding efficiency of an image.

Figure 6:
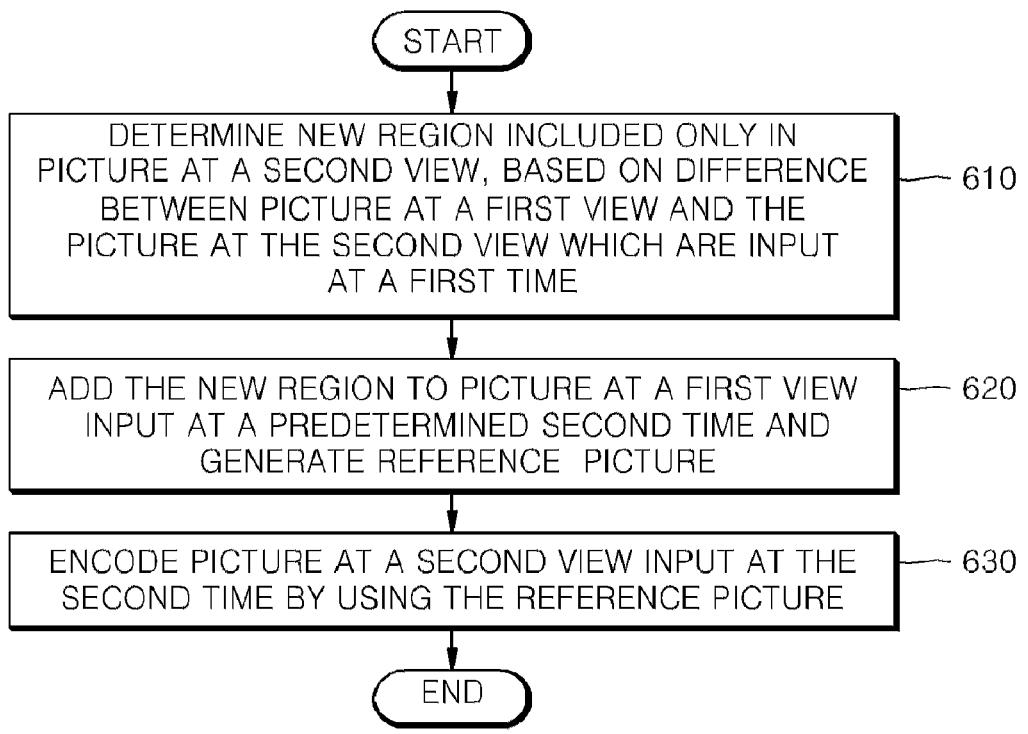
FIG. 6 is a flowchart illustrating a method of encoding a multi-view image according to another exemplary embodiment of the present invention.

FIG. 6 is a flowchart illustrating a method of encoding a multi-view image according to another exemplary embodiment of the present invention.

Figure 1:
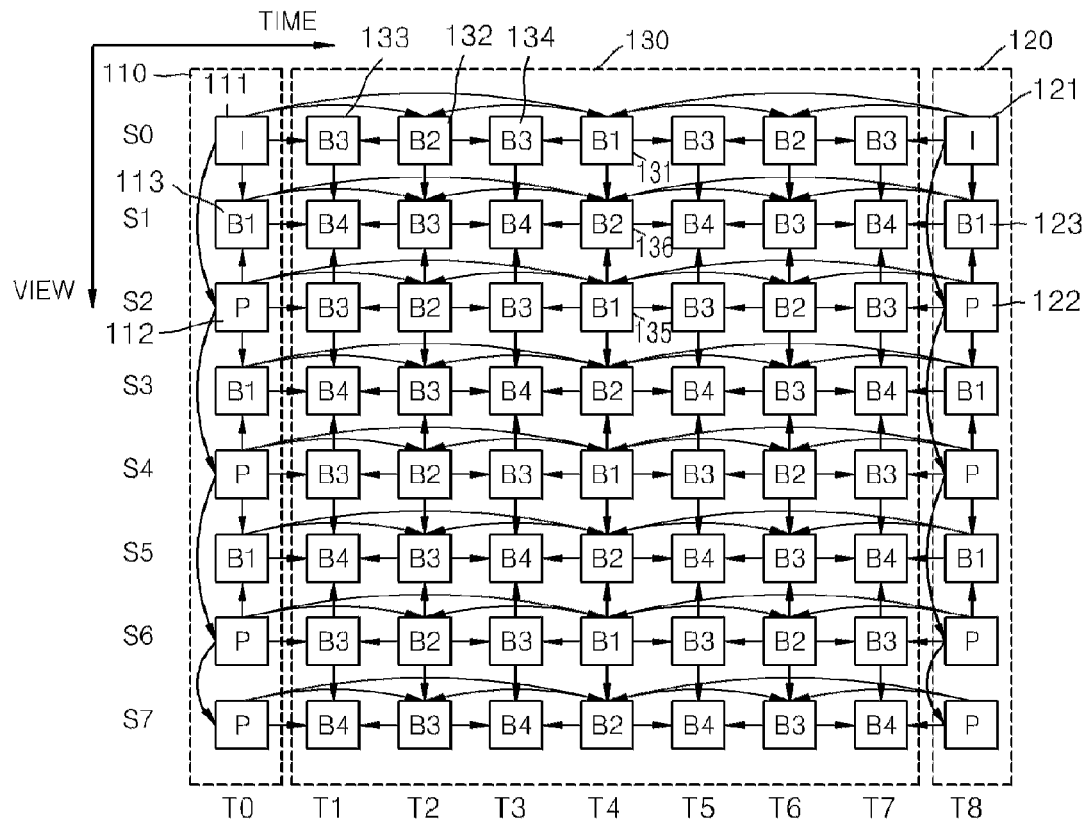
FIG. 1 is a reference diagram illustrating prediction encoding of a multi-view image.
Figure 2:
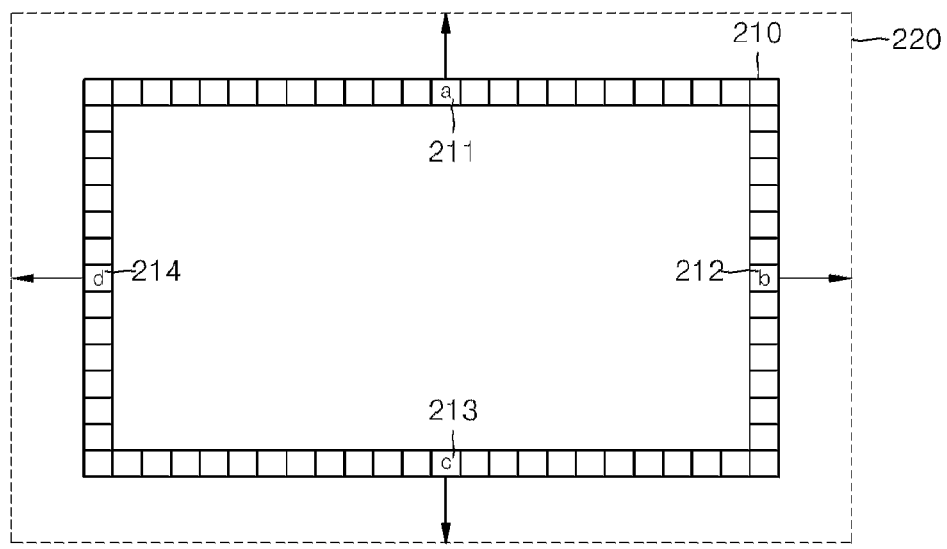
FIG. 2 is a diagram illustrating a method of extending a reference picture according to the related art.
Figure 3:
FIG. 3 is a reference diagram illustrating an example of a reference picture extended according to the related art.

Referring to FIG. 6, in operation 610, from among pictures of a multi-view image input during a predetermined time period via a plurality of image obtainment apparatuses having different views, based on a difference between a picture at a first view and a picture at a second view which are input at a predetermined first time, a new region of the picture at the second view is determined, wherein the new region is not included in the picture at the first view but included in the picture at the second view. Here, the predetermined first time indicates time when an anchor picture including an I picture to be initially encoded from among pictures of a multi-view image is input. In general, the predetermined first time indicates time when the pictures of the multi-view image are initially input. For example, like an I picture 111 initially input at a first view S0 illustrated in FIG. 1, a time when an instantaneous decoding refresh (IDR) picture affecting prediction encoding of another multi-view picture is input corresponds to the predetermined first time.

In an exemplary embodiment of the present invention, a first view indicates a viewpoint when a picture to be encoded as an I picture or a P picture is input, wherein the picture is from among anchor pictures input at a first time. A second view indicates a viewpoint when a picture to be encoded as a P picture is input, wherein the picture is from among anchor pictures input at a second time. For example, in FIG. 1, one of S0, S2, S4, and S6 corresponds to the first view, and one of S2, S4, S6, and S7 corresponds to the second view.

As mentioned above, in a multi-view image, a region that is not viewed by one camera may be viewed by another camera according to arranged positions of the cameras. Referring back to FIG. 5, in consideration of a difference in views according to the arranged positions of the first camera 510 having the first view and the second camera 520 having the second view, the new region 530 of a 'b' picture may be determined, wherein the new region 530 is included in the 'b' picture obtained by the second camera 520 having the second view but not included in an 'a' picture obtained by the first camera 510 having the first view.

In operation 620, the new region 530 is added to a picture at a first view input at a second time, and thus, a reference picture is generated. Here, the second time indicates a time when an anchor picture including an I picture is input, wherein the anchor picture is from among pictures of a multi-view image input after the first time. For example, a time T8 illustrated in FIG. 1 corresponds to the second time. A picture at the first view input at the second time is a reference picture that is used in prediction encoding of a picture at a second view input at the second time. Thus, according to the present invention, a new region of a previous anchor picture having the same view as an anchor picture at a second view, which is currently being encoded, is added to an anchor picture at a first view that is referred to by the currently being encoded anchor picture at the second view, whereby a new reference picture is generated.

In operation 630, a picture at a second view input at the second time is predictably encoded by using the reference picture. That is, when the reference picture to be referred by the picture at the second view input at the second time is newly generated in operation 620, a motion prediction is performed by using the generated reference picture, and thus, the picture at the second view input on the second time is predictably encoded.

Figure 7:
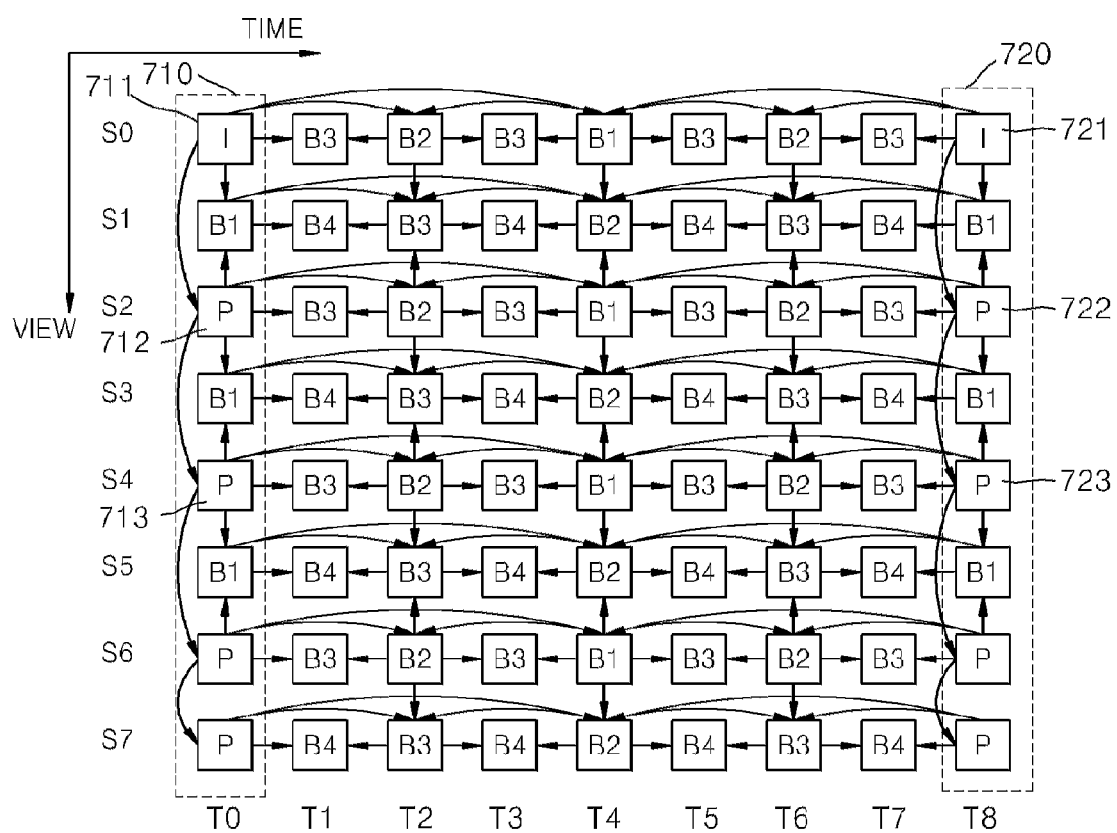
FIG. 7 is a diagram illustrating an example of pictures of a multi-view image encoded by a method of encoding a multi-view image, according to another exemplary embodiment of the present invention.

FIG. 7 is a diagram illustrating an example of pictures of a multi-view image encoded by a method of encoding a multi-view image, according to another exemplary embodiment of the present invention.

In FIG. 7, the x-axis indicates the time axis, and the y-axis indicates the view axis. T0 through T8 of the x-axis respectively indicate sampling times in which pictures are obtained, and S0 through S7 of the y-axis respectively indicate different views. In FIG. 7, respective horizontal lines indicate a group of image pictures input at the same view, and respective vertical lines indicate pictures of a multi-view image at the same time.

In a method of encoding a multi-view image according to an exemplary embodiment of the present invention, as mentioned above in relation to FIG. 1, pictures are predictably encoded by performing temporal and inter-view predictions of a hierarchical B-picture structure. In particular, in the method of encoding the multi-view image according to an exemplary embodiment of the present invention, when P pictures included in second anchor pictures 720 input at a time T8 corresponding to a second time are predictably encoded, a new region included in a picture at the same view with a P picture, which is currently being encoded, but not included in a previously encoded picture at another view, is determined, wherein the pictures are from among first anchor pictures 710 input at a first time T0, and the new region is added to a reference picture, whereby a new reference picture is generated. The related art method of encoding the multi-view image may be applied in the same manner as described above, but also with the addition of a method of generating a new reference picture by a method of encoding the multi-view image according to an exemplary embodiment of the present invention.

Specifically, when a P picture denoted as a reference numeral 722 in FIG. 7 is assumed to be a picture which is currently being encoded, the P picture 722 is predictably encoded by using an I picture 721 at a first view S0 input at the same time as a reference picture. Here, according to an exemplary embodiment of the present invention, the I picture 721 is not used as a reference frame. The present exemplary embodiment determines a new region of a P picture 712, wherein the new region is included in the P picture 712 input at a time T0 at a view S2 in the same manner as the P picture 722 but not included in an I picture 711 encoded before the P picture 712. The new region of the P picture 712 is added to the I picture 721 referred to by the currently being encoded P picture 722, thereby generating a new reference picture, and encodes the P picture 722 by using the generated new reference picture.

Similarly, when a P picture denoted as a reference numeral 723 is assumed to be a picture which is currently being encoded, the P picture 723 is predictably encoded by using the P picture 722 at a third view S2 input at the same time as a reference picture. At this time, a new region of a P picture 713 is determined, wherein the new region is included in the P picture 713 input at the time T0 at a view S4 in the same manner as the P picture 723 but not included in the P picture 712 encoded before the P picture 713 A new reference picture is generated by adding the new region of the P picture 713 to the P picture 722 referred to by the currently being encoded P picture 723, and the P picture 723 is encoded by using the generated new reference picture.

Meanwhile, a method of adding a previous anchor picture to a reference picture and thereby generating a new reference picture according to an exemplary embodiment of the present invention may be applied only when a P picture from among anchor pictures is predictably encoded. It is because a B-picture from among the anchor pictures may be bi-directionally predicted by referring to two pictures at two different views input at the same time by inter-view prediction. In other words, since a P picture is predictably encoded by using only one reference picture, there is a high chance that an occlusion region may exist in a reference picture. However, since a B-picture uses two reference pictures, a region that does not appear in one reference picture may appear in another reference picture.

FIG. 8 is a diagram illustrating an example in which a reference picture is generated by a method of encoding a multi-view image, according to another exemplary embodiment of the present invention.

In FIG. 8, a reference numeral 810 indicates a picture input at a first view S0 at a time T0 corresponding to a first time, and corresponds to the I picture 711 of FIG. 7. A reference numeral 820 indicates a picture input at a third view S2 at the time T0, and corresponds to the P picture 712 of FIG. 7. A reference numeral 830 indicates a picture input at a fifth view S4 at the time T0, and corresponds to the I picture 713 of FIG. 7. A reference numeral 840 indicates a picture input at a first view S0 at a time T8 corresponding to a second time, and corresponds to the I picture 721 of FIG. 7. A reference numeral 850 indicates a picture input at a third view S2 at the time T8, and corresponds to the P picture 722 of FIG. 7. A reference numeral 860 indicates a picture input at a fifth view S4 at the time T8, and corresponds to the P picture 723 of FIG. 7.

Referring to FIGS. 7 and 8, the P picture 850 input at the third view S2 at the time T8 is predictably encoded by using the I picture 840 at the first view S0 input at the same time as a reference picture. In such a case, the present exemplary embodiment determines a new region 822 of the P picture 820, wherein the new region 822 is included in the P picture 820 input at the time T0 at the view S2 which is the same view as that of the P picture 850, but is not included in the I picture 810 encoded before the P picture 820. The new region 822 of the P picture 820 is added to the I picture 840 referred to by the currently being encoded P picture 850, thereby generating a new reference picture, and encodes the P picture 850 by using the generated new reference picture. That is, the P picture 850 is predictably encoded by using a picture generated by adding the new region 822 of the previous P picture 820 to the original I picture 840 of FIG. 8, as a reference picture.

Similarly, the P picture 860 input at the fifth view S4 at the time T8 is predictably encoded by using the P picture 850 at the third view S2 input at the same time as a reference picture. In this case, the present exemplary embodiment determines a new region 833 of the P picture 830, wherein the new region 833 is included in the P picture 830 input at the time T0 at the view S4 which is the same view as that of the P picture 860, but is not included in the P picture 820 encoded before the P picture 830. The new region 833 of the P picture 830 is added to the P picture 850 referred to by the currently being encoded P picture 860, thereby generating a new reference picture, and encodes the P picture 860 by using the generated new reference picture. Reference numerals 811, 821, and 831 which are not described indicate an image area commonly covered by each of the I picture 810, the P picture 820, and the P picture 830. Reference numeral 832 indicates an image area in the P picture 830 that corresponds to the image area 822 in the P picture 820.

Figure 9A:
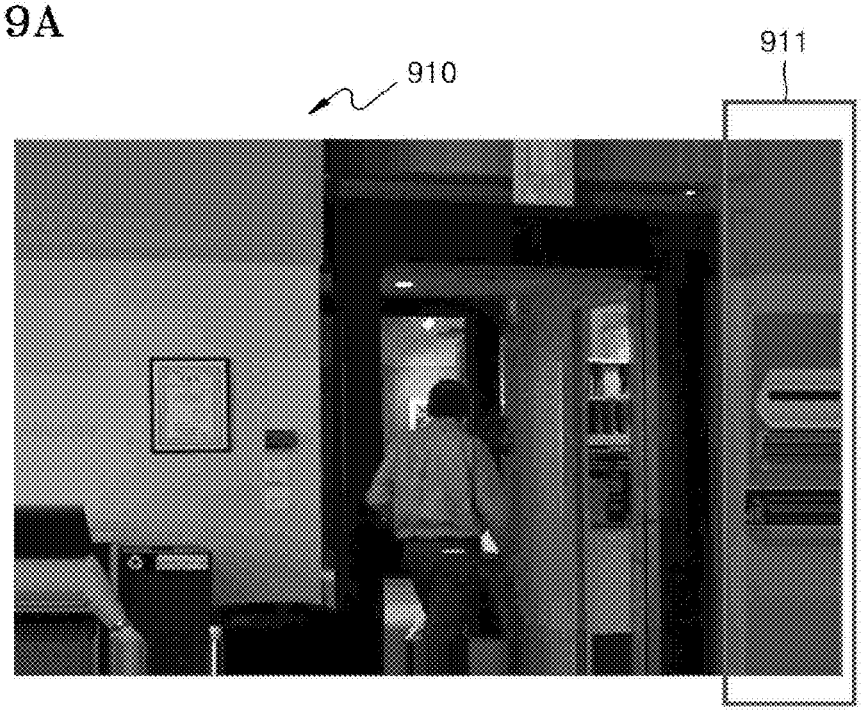
FIGS. 9A and 9B are diagrams for comparing reference pictures respectively generated according to the related art and an exemplary embodiment of the present invention.
Figure 9B:
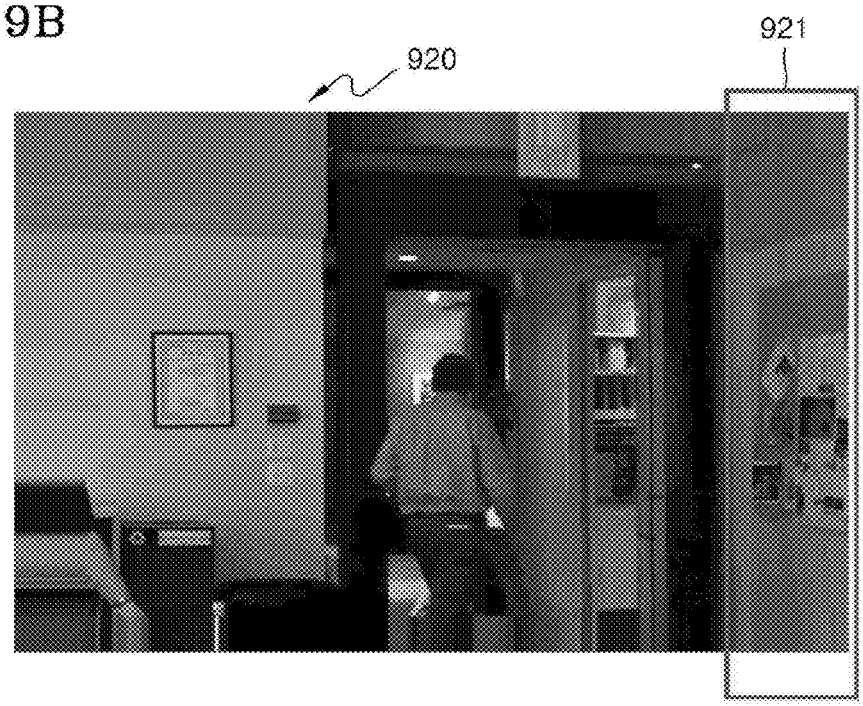

FIGS. 9A and 9B are diagrams for comparing reference pictures respectively generated according to the related art and the present invention.

FIG. 9A indicates a reference picture generated by extending an edge of a reference picture, according to the related art. FIG. 9B indicates a reference picture newly generated by adding a new region of a previous anchor picture to a reference picture, according to an exemplary embodiment of the present invention.

Referring to FIGS. 9A and 9B, when a right extension region 911 of a reference picture 910 is extended according to the related art and a right extension region 921 of a reference picture 920 generated according to the present exemplary embodiment are compared, it is understood that the extension region 911 according to the related art is a result of mere extension of pixels at an edge. Thus, prediction efficiency of a picture to be encoded by referring to the extension region 911 may be lowered. However, since the present exemplary embodiment can generate a more specific reference picture by obtaining an image region from another picture, wherein the image region is not obtained from an original reference picture, and by adding the image region, prediction efficiency of pictures to be encoded by referring to such an added region also increases.

Figure 10:
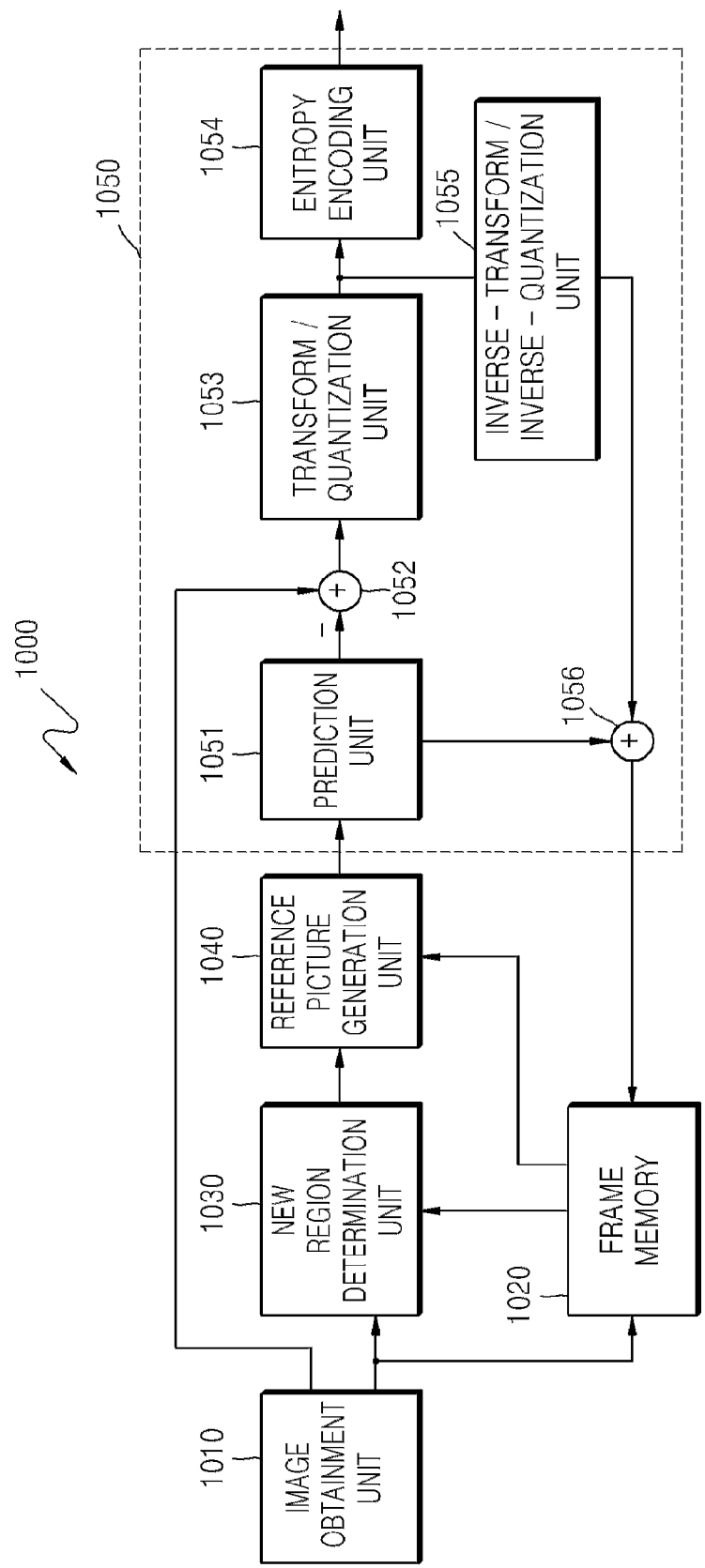
FIG. 10 is a block diagram illustrating a multi-view image encoding apparatus according to another exemplary embodiment of the present invention.

FIG. 10 is a block diagram illustrating a multi-view image encoding apparatus 1000 according to another exemplary embodiment of the present invention.

Referring to FIG. 10, the multi-view image encoding apparatus 1000 according to the present exemplary embodiment includes an image obtainment unit 1010, a frame memory 1020, a new region determination unit 1030, a reference picture generation unit 1040, and an encoding unit 1050.

The image obtainment unit 1010 includes an image obtainment apparatus such as cameras having different views. For example, the image obtainment unit 1010 may be formed in a similar manner to that previously illustrated in FIGS. 4A and 4B.

The frame memory 1020 stores pictures of a multi-view image input from the image obtainment unit 1010 and pictures that are previously encoded and then reconstructed.

The new region determination unit 1030 determines a new region of a picture at a second view, wherein the new region is not included in a picture at a first view but included in the picture at the second view. The new region is determined based on a difference between the pictures at the first and second views input at a predetermined first time, wherein the pictures are from among pictures of a multi-view image input during a predetermined time period via the image obtainment unit 1010. As mentioned above, the first time indicates a time when an anchor picture including an initial I picture is input, wherein the anchor picture is from among pictures of a multi-view image.

The reference picture generation unit 1040 adds a newly obtained region to a picture at the first view input at a predetermined second time, thereby generating a reference picture. The picture at the first view input at the second time indicates a reference picture used in prediction encoding of a picture at the second view input at the second time. As mentioned above, in particular, the present exemplary embodiment may be applied to prediction encoding of P pictures from among second anchor pictures input at the second time.

The encoding unit 1050 predictably encodes the picture at the second view input on the second time by using the reference picture The encoding unit 1050 includes a prediction unit 105 1, a subtraction unit 1052, a transform/quantization unit 1053, an entropy encoding unit 1054, an inverse-transform/inverse-quantization unit 1055, and an addition unit 1056.

The prediction unit 1051 divides a picture which is currently being encoded into blocks having a predetermined size, and generates prediction blocks related the respective blocks by intra and motion predictions. In particular, according to the present exemplary embodiment, when a motion prediction is performed on a P picture included in the second anchor pictures 720 illustrated in FIG. 7, the motion prediction is performed by using a reference picture newly generated according to the method mentioned above.

When a prediction value of a current picture is generated by the intra prediction or the motion prediction, the subtraction unit 1051 subtracts the prediction value from the current picture, and thus calculates a difference value. The transform/quantization unit 1053 transforms and quantizes the difference value. The entropy encoding unit 1054 entropy encodes the transformed and quantized differential value, thereby generating a bitstream. The inverse-transform/inverse-quantization unit 1055 reconstructs the transformed and quantized differential value. The addition unit 1056 reconstructs the current picture by adding the reconstructed differential value and prediction value, and stores the reconstructed picture in the frame memory 1020. The reconstructed picture stored in the frame memory 1020 is used in prediction encoding of a next picture.

Figure 11:
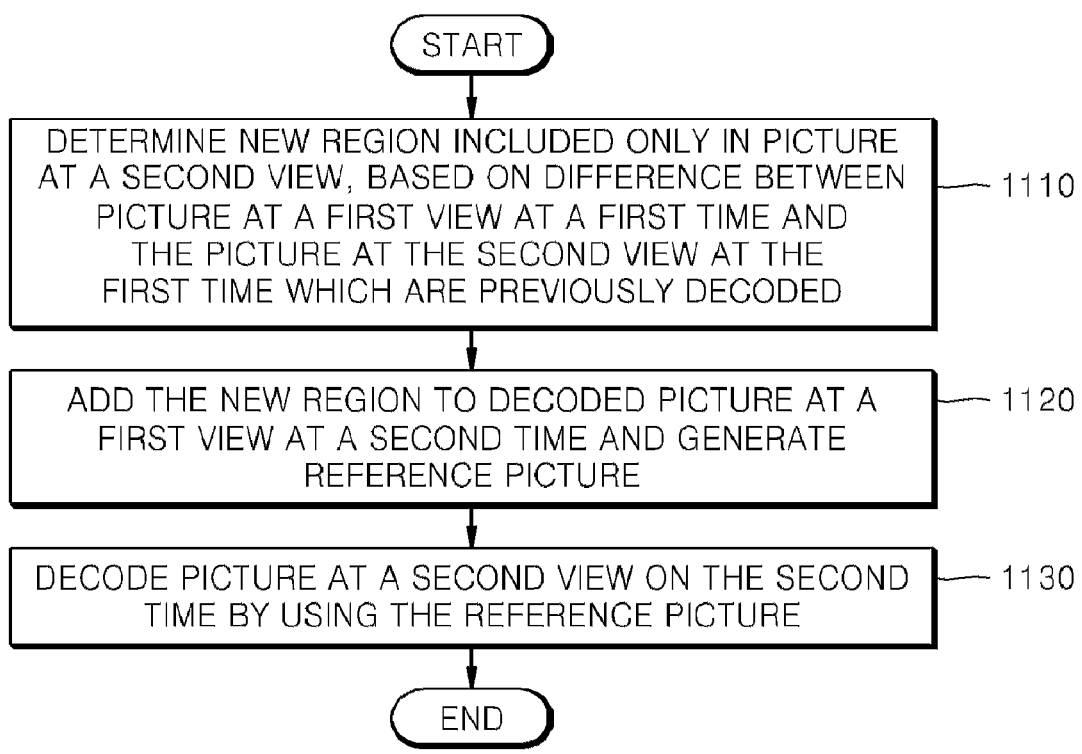
FIG. 11 is a flowchart illustrating a method of decoding a multi-view image according to another exemplary embodiment of the present invention.

FIG. 11 is a flowchart illustrating a method of decoding a multi-view image according to another exemplary embodiment of the present invention.

In operation 1110, based on a difference between a picture at a first view at a first time and a picture at a second view at the first time, which are previously encoded from among encoded pictures of a multi-view image having different views included in a bitstream, a new region of the picture at the second view is determined, wherein the new region is not included in the picture at the first view but included in the picture at the second view.

In operation 1120, the new region is added to a previously encoded picture at the first view at a second time, and thus, a reference picture is generated. In particular, according to the present exemplary embodiment, when decoding is performed on a P picture from among the second anchor pictures 720 illustrated in FIG. 7, a new region only included in a previous anchor at the same view is added to a reference picture, and thus, a new reference picture is generated.

In operation 1130, a picture at the second view at the second time is decoded by using the generated new reference picture.

Figure 12:
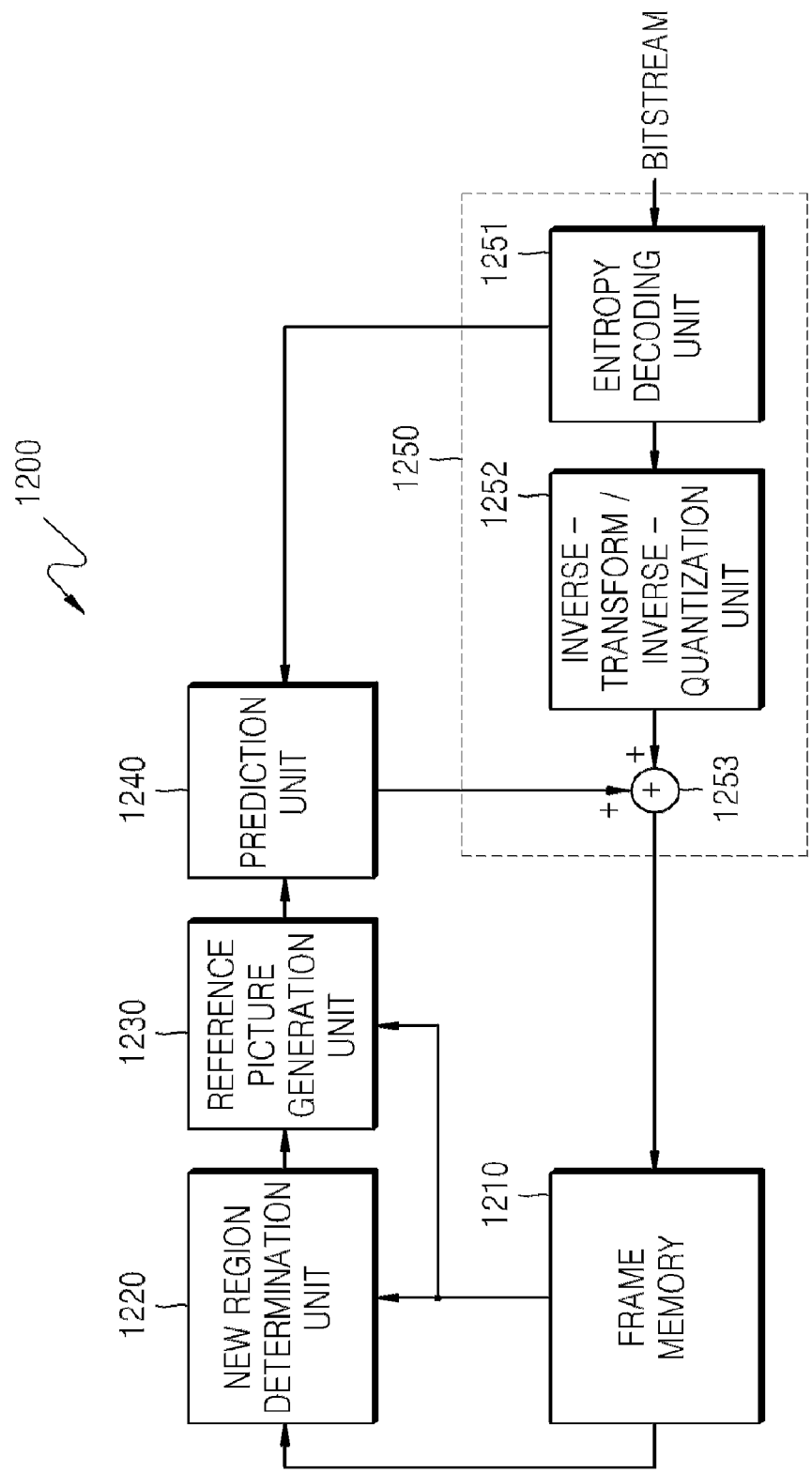
FIG. 12 is a block diagram illustrating a multi-view image decoding apparatus according to another embodiment of the present invention.

FIG. 12 is a block diagram illustrating a multi-view image decoding apparatus 1200 according to another exemplary embodiment of the present invention.

Referring to FIG. 12, the multi-view image decoding apparatus 1200 according to the present embodiment includes a frame memory 1210, a new region determination unit 1220, a reference picture generation unit 1230, a prediction unit 1240, and a decoding unit 1250.

The frame memory 1210 stores previously decoded pictures of a multi-view image.

The new region determination unit 1220 determines a new region of a picture at a second view, wherein the new region is not included in a picture at a first view but included in the picture at the second view, based on a difference between the pictures at the first and second views at a first time. The pictures are previously decoded from among encoded pictures of a multi-view image having differential views included in a bitstream.

The reference picture generation unit 1230 adds the new region to a picture at the first view at a second time, thereby generating a reference picture.

According to a prediction mode of a current picture that is to be decoded, the prediction unit 1240 performs intra prediction or a motion prediction on the current picture, thereby generating a prediction value. In particular, when the prediction unit 1240 according to the present exemplary embodiment decodes a P picture from among the second anchor pictures 720 illustrated in FIG. 7, as mentioned above, the prediction unit 1240 uses a new reference picture generated by adding a new region included only in a previous anchor picture at the same view to a reference picture, and thus, performs the motion prediction.

The decoding unit 1250 reconstructs a difference value of a current picture included in a bitstream, and adds the reconstructed differential value to the prediction value generated in the prediction unit 1240, thereby reconstructing the current value. The decoding unit 1250 includes an entropy decoding unit 1251, an inverse-transform/inverse-quantization unit 1252, and an addition unit 1253, and reconstructs an encoded differential value of a current picture by a procedure that is the inverse of an encoding procedure.

According to exemplary embodiments of the present invention, in a hierarchical B-picture structure, prediction efficiency of an anchor picture used as a reference picture for other non-anchor pictures is increased, and due to this, prediction efficiency of a B-picture referring to the anchor picture is increased, thereby increasing entire encoding efficiency.

Also, according to exemplary embodiments of the present invention, a reference picture is generated by using a previously encoded anchor picture from among pictures of a multi-view image, thus, encoding efficiency of the multi-view image can be increased without greatly increasing operation quantity.

Also, a system according to exemplary embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While this invention has been particularly shown and described with reference to exemplary embodiments thereof, it will be understood by those of ordinary skill in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of encoding a multi-view image, the method comprising:
   determining a new region of a picture at a second view, wherein the new region is not comprised in a picture at a first view but comprised in the picture at the second view, based on a difference in views between the picture at the first view and the picture at the second view which are input at a first time, wherein the pictures are from among pictures of a multi-view image input during a first time period via a plurality of image obtainment apparatuses having different views;
   adding the new region to a picture at the first view input at a second time and generating a reference picture; and
   encoding a picture at the second view input at the second time based on the generated reference picture,
   wherein the determining of the new region comprises determining the new region only comprised in the picture at the second view input at the first time, based on a difference in views between the picture at the first view and the picture at the second view input at the first time.

2. The method of claim 1, wherein the picture at the first view and the picture at the second view which are input at the first time are anchor pictures corresponding to one of I and P pictures.

3. The method of claim 1, wherein the adding the new region comprises adding the new region to any one side of the picture at the first view input at the second time, based on the difference in views between the picture at the first view and the picture at the second view input at the first time.

4. The method of claim 1, wherein the first time indicates a time when initial pictures from among the pictures of the multi-view image input during the first time period are input, and the second time indicates a time when a last picture from among the pictures of the multi-view image is input.

5. The method of claim 1, wherein the pictures of the multi-view image are encoded by using a hierarchical B-picture structure.

6. A multi-view image encoding apparatus, the multi-view encoding apparatus comprising:
   a plurality of image obtainment apparatuses having different views;
   a new region determination unit determining a new region of a picture at a second view, wherein the new region is not comprised in a picture at a first view but comprised in the picture at the second view, based on a difference between the picture at the first view and the picture at the second view which are input at a first time, wherein the pictures are from among pictures of a multi-view image input during a first time period via the plurality of image obtainment apparatuses;
   a reference picture generation unit adding the new region to a picture at the first view input at a second time and generating a reference picture; and
   an encoding unit encoding a picture at the second view input at the second time based on the generated reference picture,
   wherein the new region determination unit determines the new region only comprised in the picture at the second view input at the first time based on a difference in views between the picture at the first view and the picture at the second view input at the first time.

7. The multi-view image encoding apparatus of claim 6, wherein the picture at the first view and the picture at the second view which are input at the first time are anchor pictures corresponding to one of I and P pictures.

8. The multi-view image encoding apparatus of claim 6, wherein the reference picture generation unit adds the new region to any one side of the picture at the first view input at the second time, based on the difference in views between the picture at the first view and the picture at the second view input at the first time.

9. The multi-view image encoding apparatus of claim 6, wherein the first time indicates a time when initial pictures from among the pictures of the multi-view image input during the first time period are input, and the second time indicates a time when a last picture from among the pictures of the multi-view image is input.

10. The multi-view image encoding apparatus of claim 6, wherein the encoding unit encodes the pictures of the multi-view image by using a hierarchical B-picture structure.

11. A method of decoding a multi-view image, the method comprising:

determining a new region of a picture at a second view, wherein the new region is not comprised in a picture at a first view but comprised in the picture at the second view, based on a difference between the picture at the first view at a first time and the picture at the second view at the first time, which are previously decoded from among encoded pictures of a multi-view image having differential views and included in a bitstream;

adding the new region to a decoded picture at the first view at a second time and generating a reference picture; and decoding a picture at the second view at the second time based on the generated reference picture, wherein the determining of the new region comprises determining the new region only comprised in the picture at the second view at the first time based on a difference in views between the picture at the first view at the first time and the picture at the second view at the first time.

12. The method of claim 11, wherein the picture at the first view at the first time and the picture at the second view at the first time are anchor pictures corresponding to one of I and P pictures.

13. The method of claim 11, wherein the pictures of the multi-view image are decoded by using a hierarchical B-picture structure.

14. A computer readable recording medium determining a new region of a picture at a second view, wherein the new region is not comprised in a picture at a first view but comprised in the picture at the second view, based on a difference in views between the picture at the first view at a first time and the picture at the second view at the first time, which are previously decoded from among encoded pictures of a multi-view image having differential views and included in a bitstream;

adding the new region to a decoded picture at the first view at a second time and generating a reference picture; and decoding a picture at the second view at the second time based on the generated reference picture, wherein the determining of the new region comprises determining the new region only comprised in the picture at the second view at the first time, based on a difference in views between the picture at the first view at the first time and the picture at the second view at the first time.

15. The computer readable recording medium of claim 14, wherein the picture at the first view at the first time and the picture at the second view at the first time are anchor pictures corresponding to one of I and P pictures.

16. The multi-view image decoding method of claim 14, wherein the decoding unit decodes the pictures of the multi-view image by using a hierarchical B-picture structure.

\* \* \* \* \*